United States Patent

[11] 3,614,653

[72] Inventors Ali Javan
 Boston, Mass.;
 William R. Bennett, Jr., New Haven,
 Conn.; Donald R. Herriott, Morristown,
 N.J.
[21] Appl. No. 277,651
[22] Filed May 2, 1963
[45] Patented Oct. 19, 1971
[73] Assignee Bell Telephone Laboratories, Incorporated
 New York, N.Y.
 Continuation-in-part of application Ser. No.
 79,062, Dec. 28, 1960, now Patent No.
 3,149,290, dated Sept. 15, 1964.

[54] OPTICAL MASER
 11 Claims, 4 Drawing Figs.
[52] U.S. Cl. .......................................................... 331/94.5,
 330/4.3
[51] Int. Cl. ........................................................... H01s 3/00
[50] Field of Search ............................................. 331/94.5;
 330/4.3

*Primary Examiner*—Ronald L. Wibert
*Assistant Examiner*—V. P. McGraw
*Attorneys*—R. J. Guenther and Arthur J. Torsiglieri CLAIM: 1. An optical maser comprising:
 means for producing free electrons within an enclosed space, a first and a second gas within the enclosed space,
 the first gas possessing a metastable energy level above its ground state to which atoms thereof may be raised by collision with said free electrons,
 the second gas possessing an energy level system with at least two levels above the ground state,
 the separation of the higher of said two levels from the ground state substantially matching the separation of said metastable level of the first gas from its ground state, so that atoms of the first gas which are in the metastable state collide with ground state atoms of the second gas and excite said ground state atoms to said higher level, thereby creating a population inversion between a pair of energy levels of said second gas so that emission of coherent optical radiation may be stimulated at a frequency corresponding to the energy separation therebetween,
 means for forming resonant modes of said coherent radiation within the enclosed space comprising two optically reflecting members defining a light beam path therethrough,
 and means for abstracting said coherent radiation for utilization.

PATENTED OCT 19 1971
3,614,653
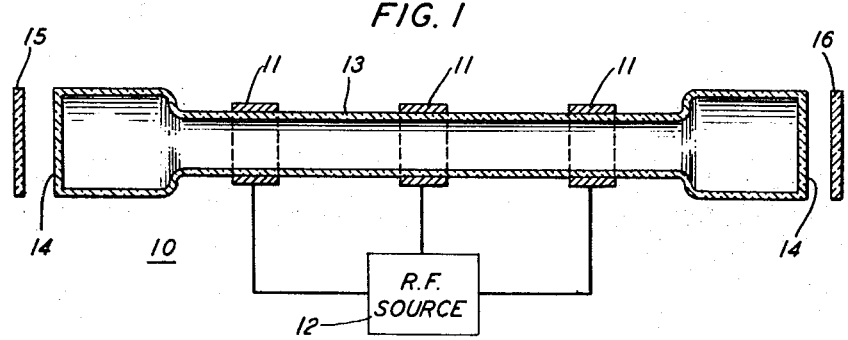
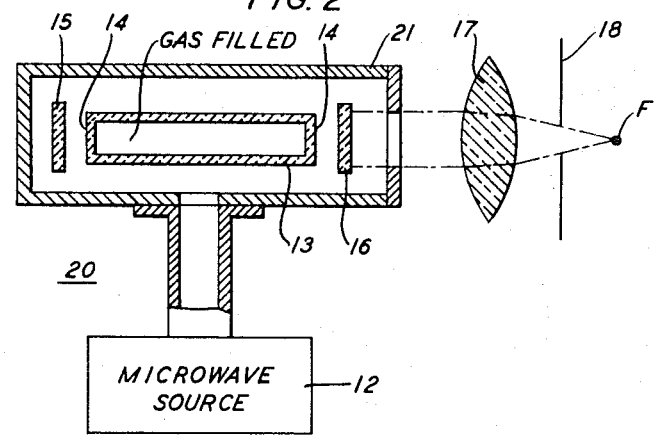
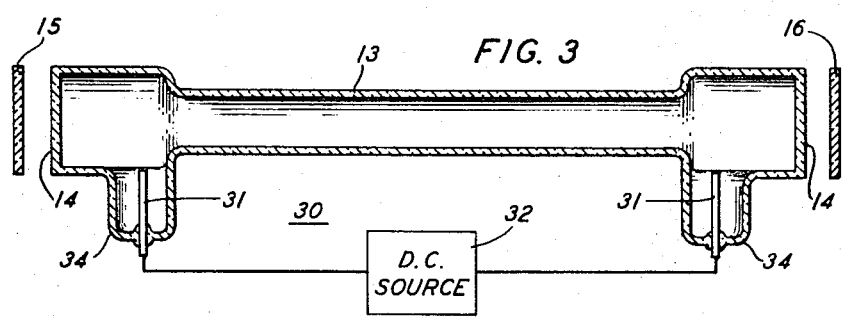
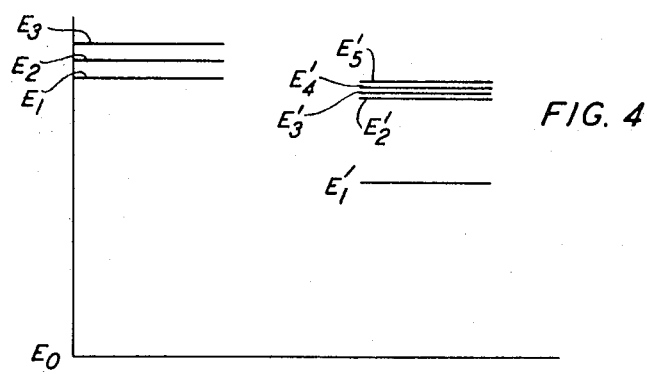
INVENTORS
ALI JAVAN
WILLIAM R. BENNETT, JR.
DONALD R. HERRIOTT
BY
*Ralph M Braunstein*
ATTORNEY

OPTICAL MASER

This application is a continuation-in-part of application Ser. No. 79,062, filed Dec. 28, 1960, now U.S. Pat. No. 3,149,290, issued Sept. 15, 1964.

This invention relates to optical masers. More particularly it relates to negative temperature media and the production of population inversions therein.

One embodiment of the invention is a maser in which energetic electrons are used to establish a negative temperature, i.e., population inversion, between a pair of energy levels of a gaseous active medium. The energy separation of the inverted pair of levels corresponds to an optical wavelength. In accordance with the principles of maser action, the emission of substantially monochromatic light may be coherently stimulated from a medium in such an inverted population state. There are many applications where a source of monochromatic light such as an optical maser oscillator is useful. Optical masers may also be used to amplify light signals of the wavelength corresponding to the inverted population condition.

Various forms of optical masers have previously been proposed but such forms typically involve optical pumping, i.e., energy of one or more optical wavelengths is used to establish a negative temperature at a different and typically longer optical wavelength. The wavelength of the pump light must correspond to that of one or more absorption lines of the active medium which tend to populate the upper level of the maser transition. However, it usually is difficult to provide conveniently adequate pumping energy of the necessary optical wavelength to achieve a negative temperature at a longer wavelength in this fashion.

To this end, a feature of the invention is an arrangement whereby energy of a type which is readily available is used to excite electrons which then produce in an appropriate medium a negative temperature or population inversion corresponding to a particular optical wavelength. In one illustrative embodiment radiofrequency energy is applied to a suitable enclosed gas to ionize the gas, and the electrons of the resulting plasma or discharge then collide with and thereby excite unionized atoms of this same gas from a lower to an upper energy state. Advantageously, the upper level of the gas is metastable so that accumulation of excited atoms occurs.

In the preferred embodiment, the enclosure also includes a second gas whose energy level system includes at least three discrete levels of which two levels have a separation which corresponds to the optical wavelength at which a negative temperature is desired and the highest level is substantially matched to the excited metastable level of the first gas. Thus, the corresponding levels of the two gasses will tend to reach thermal equilibrium with one another resulting in the transfer of excitation to the second gas. In an illustrative embodiment, helium gas serves as the first or auxiliary gas and neon as the second or active gas.

The invention will be better understood from the following more detailed description, taken in conjunction with the accompanying drawing, in which:

FIGS. 1, 2 and 3 show longitudinal cross sections of optical masers in accordance with the invention, with some associated equipment; and FIG. 4 is an energy level diagram which aids in understanding the principles of the invention. Similar parts are indicated by the same reference numeral throughout the drawing.

As discussed above, by way of example, the tube 13 typically contains an active medium comprising helium as the auxiliary gas and neon as the active gas. The helium concentration may correspond, for example, to a partial pressure of about 0.1 millimeter of mercury and the neon concentration to a partial pressure of about 10.0 millimeters of mercury. In general, however, it is desirable—but not necessary—that the proportion of helium exceed that of neon so as to encourage to a greater extent the transfer of energy by the mechanism disclosed herein. In particular, in application Ser. No. 79,062 filed Dec. 28, 1960 by Ali Javan, W. R. Bennett, Jr. and Donald R. Herriott, now U.S. Pat. No. 3,149,298, there is described a system in which the helium concentration corresponds to a pressure of about one millimeter of mercury and the neon concentration to 100 microns of mercury. There is also described a system in which the helium concentration is about 10 millimeters of mercury and the neon concentration about 0.1 millimeters of mercury. The invention is operable over a broad range of partial pressures in the helium-neon mixture, although the intensity of the stimulated emission is not constant over the entire range. Typical measurements of the power output corresponding to various gas pressures in an optical maser oscillator employing the invention are presented, for instance, in an article by C. K. N. Patel in the Journal of Applied Physics, Volume 33, page 3194, Nov. 1962.

The optical maser 10 shown in FIG. 1 comprises an elongated hollow tube 13, which may be of quartz, for containing a gaseous active medium of the invention. Encircling the tube 13 are a plurality of electrodes 11 which are connected to a radiofrequency source 12 for providing energy to excite an electrical discharge through the active medium. A convenient frequency for operating the invention is about 2,500 megacycles, although it is to be understood that this is not critical but may be varied over an extremely wide range. Advantageously, the pump energy is of a frequency easily controlled and readily available at sufficient power levels to produce a discharge inside the tube 13, the walls of which should therefore be substantially transparent to such energy. If desired, microwave pump energy may be coupled to the active medium by means of a resonant cavity 21 at that frequency and enclosing the gas-filled tube 13, as shown in FIG. 2. A discharge may also be excited in the gaseous active medium by means of a direct current voltage applied between electrodes included within the tube 13, as are electrodes 31 illustrated in FIG. 3. The electrodes 31 are housed in projections 34 which extend from the side of the tube 13, thereby avoiding any obstruction of the light beam path along the axis of the tube. Furthermore, the projections 34 tend to trap any material evaporated or sputtered from the electrodes 31 which might otherwise cause considerable fouling of inside surfaces of the tube 13. The ends of the tube 13 are transparent windows which define a light beam path through the active medium. To reduce reflections at the windows, they may be inclined at Brewster's angle to the beam path as disclosed in the copending application of A. G. Fox and L. U. Kibler, Ser. No. 137,260, filed Sept. 11, 1961, now abandoned.

It is characteristic of helium that its energy level system includes a large number of levels although only a small relevant portion is shown in FIG. 4. For example, it is characteristic of level $E_1$, corresponding to the $2^3S_1$ line (in the LS designation), that it is metastable. As the term is understood in the art, this means that the time it takes an atom in state $E_1$ to relax to the ground state is relatively long or, viewed differently, that the probability of the transition from level $E_1$ to level $E_o$ is small. On the other hand, the rate of decay between higher levels $E_2$, $E_3$, et cetera, to $E_1$ is large so that there is a tendency for atoms in such higher levels to decay to level $E_1$ either by a direct transition as a result of collisions or in cascade fashion as a result of successive transitions. The net effect is an accumulation of atoms in energy level $E_1$. The principal counter effect is a decay of atoms from this level to the ground state as a result of collisions with the envelope. However, it is possible by the application of sufficient radiofrequency or other energy to the helium to produce sufficient energetic free electrons for collisions with helium atoms to increase the population of helium atoms in level $E_1$ to a relatively high value.

As mentioned above, in a preferred embodiment the envelope 13 also includes neon gas. The relevant portion of the energy level system of neon also is depicted in FIG. 4. For example, neon includes four energy levels $E_2'$, $E_3'$, $E_4'$ and $E_5'$ corresponding respectively to the $2s_5$, $2s_4$, $2s_3$ and $2s_2$ levels (in Paschen notation) whose separations from the ground state $E_0'$ substantially match the separation between levels $E_0$ and $E_1$ of the helium. While maser action involving any of these levels is possible, the $2s_5$ level is to be preferred because atoms in the other levels tend to spill down and accumulate at this level. Moreover, neon also includes level $E_1'$ corresponding to the $2p_{10}$ level (in the Paschen notation) which is intermediate between levels $E_0'$ and $E_2'$ and whose separation from such level corresponds to a wavelength in the near infrared optical range.

It is characteristic of a system of the kind described that the energy level $E_2'$ of the active gas will reach close to thermal equilibrium with energy level $E_1$ of the auxiliary gas because each corresponds to essentially the same energy. Briefly, a large cross section will exist for inelastic collisions resulting in an exchange of energy between the $2^3S$ level of helium and the $2s_2$, $2s_3$, $2s_4$ and $2s_5$ levels of neon. This results in the neon population of level $E_2'$ particularly increasing to the point where its proportion of the total neon population will substantially match the proportion to the total helium population of the helium population of level $E_1$. Due to the adiabatic nature of the collisions, the levels of the neon atoms, such as $2p_{10}$, which differ in energy appreciably from that of the metastable level of the helium are not directly affected. As a consequence, a negative temperature, or population inversion, can be established between levels $E_2'$ and $E_1'$. The separation of these two levels has a wave number of 10,540 corresponding to a wavelength of about 9,500 angstroms.

In accordance with the maser principle it is known that when a negative temperature population inversion is established between a pair of energy levels in a medium, emission may be stimulated therefrom at a wavelength corresponding to the energy separation between the inverted levels. Stimulated emission occurs when radiation of the appropriate frequency is incident on the active medium and induces the excited particles to undergo transitions from the upper to the lower energy state. The emitted radiation is coherent and in phase with the stimulating signal. In the absence of an externally applied signal, emission may be stimulated by photons emitted spontaneously by some of the excited particles as they relax to the lower energy level. In either case, the stimulated emission adds to the stimulating wave so that the signal experiences gain or amplification as it travels through the medium. The amount of the amplification is proportional to the length of the ray path in the medium. The elongated geometry of a typical optical maser embodying the invention tends to establish a preferred direction, e.g., the axial direction, such that photons spontaneously emitted in that direction undergo substantially greater amplification than photons emitted in off-axial directions. Thus, the energy emitted from an end of the tube 13 is substantially monochromatic and coherent. It will be apparent that the device may be employed either as a source of such energy, or as an amplifier of externally applied signals.

To make it possible for the energy emitted to reach greater intensity and to encourage coherent emission, it is desirable that there be favored the buildup of oscillations of the frequency corresponding to the separation between levels $E_1'$ and $E_2'$. To this end, it is advantageous to utilize the principles set forth in copending application, Ser. No. 752,137, filed July 30, 1958, by A. L. Schawlow and C. H. Townes or in U.S. Pat. No. 2,851,652, which issued to R. H. Dicke on Sept. 9, 1958.

To this end, reflective plates 15 and 16 are positioned at opposite ends of the envelope 13 adjacent the windows 14 thereby enabling standing waves of the oscillatory energy to be set up between them. As is characteristic, such plates are made to be highly reflective of the energy of the wavelength of interest while absorbing little and transmitting a bit of such energy. In particular, their thickness is preferably made such that the reflections at the two faces add in phase for the wavelength of interest. Ordinarily, it is more convenient from the standpoint of adjusting their separation for optimum results that the reflective plates be separate elements as shown. Alternatively, either or both of such elements may be positioned inside the envelope or incorporated as an end plate or as a window in the cavity 21 of the embodiment shown in FIG. 2. As with the device operating without mirrors, the optical maser utilizing a cavity resonator is capable of acting as either a source or an amplifier.

As illustrated in FIG. 2 there may also be positioned in the path of the emitted light a condensing lens 17 and a slitted plate 18 to insure that substantially only energy of the desired wavelength arrives at focal point F for utilization. To this end, the lens is positioned to have its axis parallel to the axis of the envelope so that the coherent energy of desired wavelength involved in the standing wave which is set up between the two reflective plates 15, 16 and which is parallel to the lens axis will pass selectively through the slit in plate 18, while incoherent energy, typically spontaneous emission of other wavelengths, which is incident on the lens from other directions is blocked by the opaque portions of the plate 18. Again, while it is advantageous to utilize a separate lens element as shown, it is feasible to incorporate the lens either in the envelope or cavity wall.

Usually it will be advantageous to provide a coolant to keep the temperature of the envelope from increasing unduly. However, such equipment has not been shown in the drawing. Similarly, there has been omitted from the drawing gas inlets to the envelope and the various supports and spacers that would be needed to maintain the elements shown fixed in their required position.

Additionally, in some instances it may be desirable to include a trace, typically less than 1 micron of mercury, of argon vapor to quench a metastable state of neon that exists below level $E_1'$.

It is also feasible to achieve the desired negative temperature between two levels in a single gas by the apparatus described. To provide the necessary number of excited particles to make possible a useful negative temperature, the gas need be chosen to have two levels above the ground state of which the lower is not allowed for an optical transition to the ground state but the upper is so allowed. It is this characteristic that makes it feasible to employ gas pressures at least of the order of 1 millimeter of mercury which in turn makes feasible realization of a larger effect. In particular, as a consequence of this characteristic the higher level has a larger cross section for excitation by electrons. In such a gas at sufficiently high pressure the photons arising from the transition from the upper level to the ground state will be trapped, and this leads to an effectively longer lifetime for such level which is important to attaining a useful negative temperature. Neon at a pressure of about 1 millimeter of mercury has its $2s_3$ level optically connected to ground while the $2p_{10}$ level is not so connected. It is for this reason that the choice of neon in the preferred embodiment first described is particularly favorable. In such preferred embodiment, as well as in the instant one-gas system, the population of the $2s_3$ level tends to spill over into the $2s_5$ level and both levels tend to reach a negative temperature with respect to the $2p_{10}$ level.

In such a one-gas system, it is also advantageous to include a trace of a gas such as argon to quench any levels below the $2p_{10}$ level.

Conversely, in a gas such as helium at a sufficiently low pressure, a negative temperature may be attained between two levels which are above the ground state of which the upper is not optically connected to ground and the lower level is so connected.

Accordingly, it is to be understood that the specific embodiment described is merely illustrative of the general principles of the invention. Various other embodiments may be devised without departing from the spirit and scope of the invention. In particular, the preferred form of maser described may be modified to utilize different sets of gases. For example, it is feasible to employ krypton, typically at a pressure of 10 millimeters of mercury, as the first exciting gas and mercury vapor, typically at a pressure of about 0.001 millimeter of mercury, as the second excited gas.

Communication systems of the kind in which optical masers in accordance with the invention can be incorporated are described in the aforementioned application of A. L. Schawlow and C. H. Townes.

What is claimed is:

1. An optical maser comprising:
   means for producing free electrons within an enclosed space, a first and a second gas within the enclosed space,
   the first gas possessing a metastable energy level above its ground state to which atoms thereof may be raised by collision with said free electrons,
   the second gas possessing an energy level system with at least two levels above the ground state,
   the separation of the higher of said two levels from the ground state substantially matching the separation of said metastable level of the first gas from its ground state, so that atoms of the first gas which are in the metastable state collide with ground state atoms of the second gas and excite said ground state atoms of said higher level, thereby creating a population inversion between a pair of energy levels of said second gas so that emission of coherent optical radiation may be stimulated at a frequency corresponding to the energy separation therebetween,
   means for forming resonant modes of said coherent radiation within the enclosed space comprising two optically reflecting members defining a light beam path therethrough,
   and means for abstracting said coherent radiation for utilization.

2. The optical maser of claim 1 in which the enclosed space includes a third gas for quenching metastable levels of said second gas which are below said intermediate level.

3. The optical maser of claim 1 in which the first gas is helium and the second gas is neon.

4. The optical maser of claim 2 in which the third gas is argon.

5. An optical maser comprising
   means forming an enclosed space containing a gaseous active medium,
   said active medium including a first gas having a metastable energy state above its ground state and a second gas having an upper and an intermediate energy state above its ground state,
   the separation between the ground and metastable states of said first gas substantially matching the separation of the upper state of said second gas from its ground state,
   means for producing free electrons in said enclosed space for colliding with the particles of said gases to excite said first gas to its metastable state whereby energy is transferred by inelastic collisions to the matching upper state of said second gas and a population inversion is established between said upper and intermediate states thereof so that the emission of coherent optical radiation may be stimulated therefrom at the wavelength corresponding to the separation of said inverted energy states,
   means forming an optical cavity resonator defining a light beam path through said active medium for encouraging the buildup of said coherent radiation,
   and means for abstracting said radiation from said cavity.

6. The optical maser of claim 5 in which the first gas is helium and the second gas neon.

7. An optical maser as in claim 5 wherein said free electron producing means comprises means for applying radiofrequency wave energy to said first and second gases.

8. An optical maser as in claim 5 wherein said free electron producing means comprises means for establishing an electrical discharge in said enclosed space.

9. An optical maser as in claim 1 wherein said free electron producing means comprises means for applying radiofrequency energy to said first and second gases.

10. An optical maser as in claim 1 wherein said free electron-producing means comprises means for producing an electrical discharge in said enclosed space.

11. An optical maser comprising
    means forming an enclosed space for containing a gaseous active medium,
    said medium including an active gas having an energy level system characterized by a pair of levels above the ground state,
    the upper energy level of said pair being optically connected to the ground state and having a larger cross section for collision excitation from the ground state and a longer lifetime than the lower level,
    means for producing free electrons in said enclosed space, said electrons being effective to collide with particles of the active gas, excite them to the upper energy level and produce a population inversion with respect to the lower level,
    means forming an optical cavity resonator for defining a path through said active medium for light rays to stimulate coherent emission therefrom
    and means for abstracting the stimulated emission from said resonator.